June 27, 1933.  A. G. LUNDIN ET AL  1,915,542
TAP CHUCK
Filed Dec. 15, 1931   2 Sheets-Sheet 1

INVENTOR
Axel G. Lundin
BY Carl W. Johnson
Sydney J. Prescott
ATTORNEY

June 27, 1933.   A. G. LUNDIN ET AL   1,915,542
TAP CHUCK
Filed Dec. 15, 1931   2 Sheets-Sheet 2
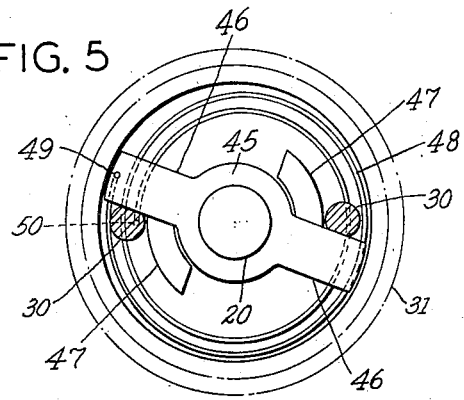
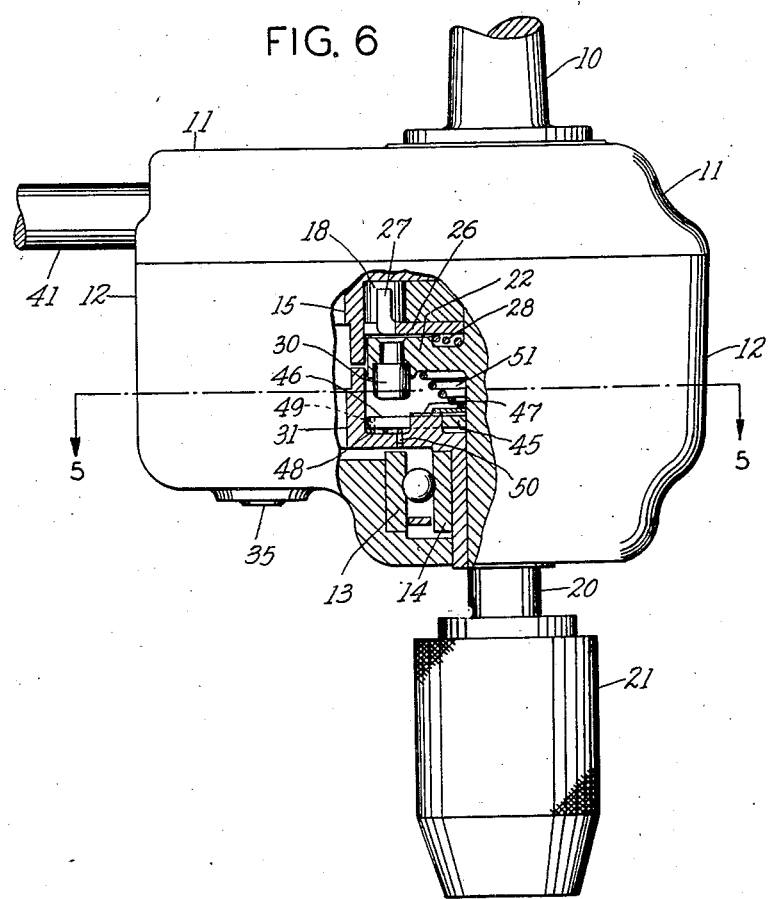

Patented June 27, 1933

1,915,542

UNITED STATES PATENT OFFICE

AXEL G. LUNDIN AND CARL W. JOHNSON, OF BROOKLYN, NEW YORK, ASSIGNORS TO AMERICAN MACHINE & FOUNDRY COMPANY, A CORPORATION OF NEW JERSEY

TAP CHUCK

Application filed December 15, 1931. Serial No. 581,255.

This invention relates to tool operating attachments for boring machines such as drill presses and the like, designed to prevent breakage and provide more convenient operation of the tools, and particularly relates to tap chucks for attachment to boring machines.

In order to prevent breakage when the tap strikes the bottom of a hole, tapping attachments have in the past been provided with clutches which release under overload but these have commonly been of the type in which one set of teeth or projections are spring pressed into another set of teeth or recesses and have been of short life, noisy and the overload under which they release has commonly been the same whether a large or small tool was used. They have also required a rather large movement to release the teeth or projections to permit them to pass out of the notches or recesses in which they engaged and in some cases some effort was required to reengage the teeth or projections.

It is one of the main objects of the invention to produce a tap chuck which eliminates or substantially reduces these objections to prior devices of this type.

Another object is to produce a tap chuck of this type which is particularly simple and compact, and relatively inexpensive to manufacture.

Another object is to provide an improved reversing mechanism to permit almost instant reversing of the direction of rotation of the tool when the tool strikes bottom and to render said reversing mechanism simpler and longer wearing than prior mechanisms and capable of smoother and more secure engagement and quicker control upon pulling up on the tool.

With these and other objects not specifically mentioned in view the invention consists in certain constructions and combinations which will be hereinafter fully described and then specifically set forth in the claims hereunto appended.

Figure 1:
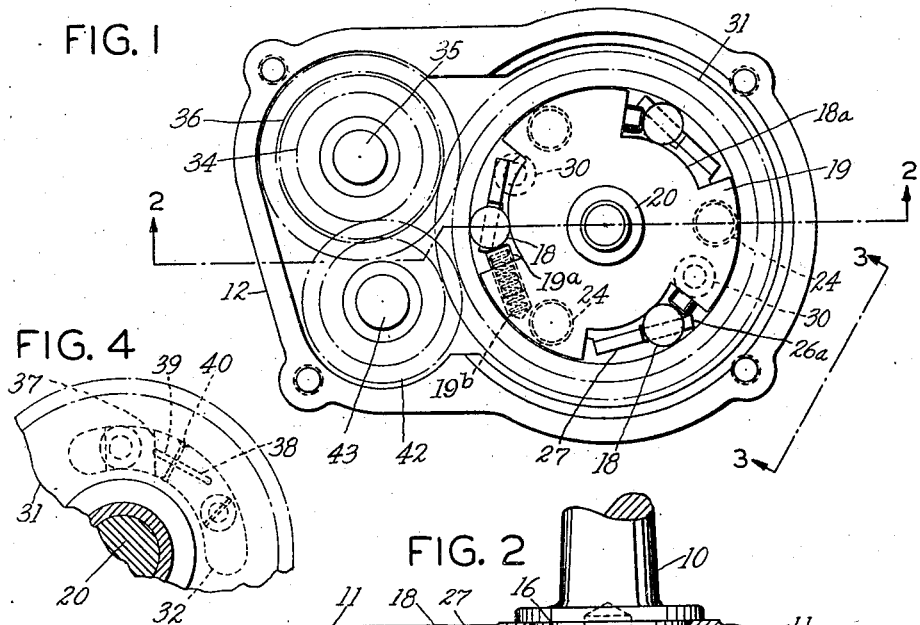
Figure 4:
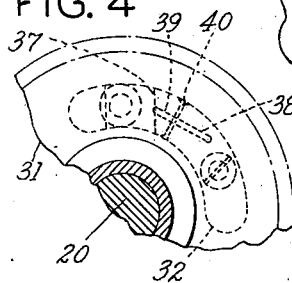
Figure 2:
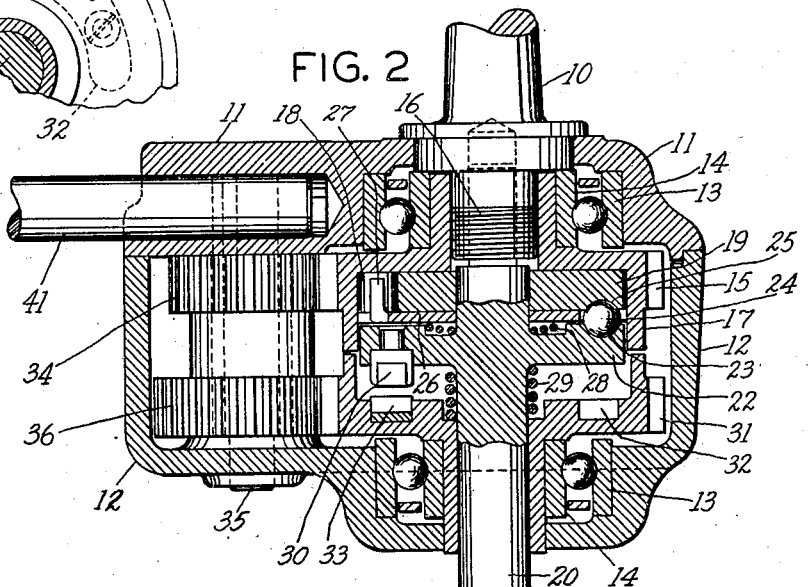
Figure 3:
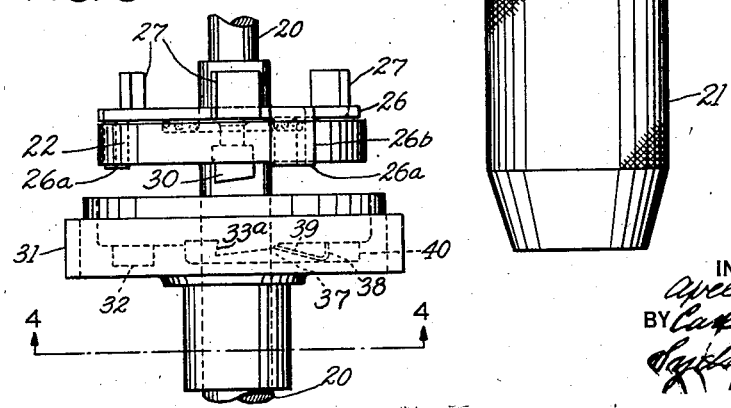

In the accompanying drawings, which form a part of this specification and in which like characters of reference indicate the same or like parts, Fig. 1 is a plan view of the approved tap chuck with its top cover removed; Fig. 2 is a sectional side elevation taken on the line 2—2 of Fig. 1; Fig. 3 is a side elevation of a detail of the mechanism, taken from the line 3—3 of Fig. 1; Fig. 4 is a detail view taken from the line 4—4 of Fig. 3; Fig. 5 is a detail plan view of a modification of the reverse clutch; and Fig. 6 is a sectional side elevation of the section shown in Fig. 5.

In carrying the invention into effect, there is provided an attachment for boring machines, with a driving spindle, a driven spindle on which the tool carrying chuck is secured, a fully releasable clutch, overload responsive mechanism, connections to transmit power from said driving spindle through said clutch and mechanism through said driven spindle, and means operated by said overload responsive device to fully release said clutch when there is an overload on the tool to prevent breakage of the tool and produce a smooth clean disengagement from the driving means. In the best constructions said clutch includes driven and driving parts one of which has a tapered recess in which a loose jam element is received, and said means including a control element connected to said mechanism and acting on said jam element to move the jam element out of driving position when the mechanism responds to an overload. Preferably said driven spindle is mounted for axial movement relative to the driving spindle, reverse gearing being connected to the driving spindle, and a clutch is provided which includes a section connected to said driven spindle for movement into engagement with the other section when the driven spindle is pulled away from the driving spindle. The various means referred to may be varied widely in construction within the scope of the claims, for the particular device selected to illustrate the invention is but one of many possible concrete embodiments of the same. The invention therefore is not to be restricted to the precise details shown and described.

Referring now to the drawings, a driving spindle or shank 10 designed to fit the usual tapered jaw of a drill press or other boring machine, is rotatably mounted in the cover 11 of a housing 12, by means of suitable bearings 13 engaging a journal bushing 14 on the hub of a gear 15 rigidly secured to a stud 16 on the shank.

The gear 15 has a depending flange 17 which forms a driving clutch part, the inner face of the flange being positioned to be engaged by jam elements, such as the rollers 18, which are located in a tapered recess 18a (see Fig. 1) in a disk 19 forming a driven clutch part, the rollers 18 being pressed against the inner face of the flange 17 by plungers 19a in sockets in the disk 19 urged outwardly by springs 19b disposed within the plungers and seated against the inner ends of the sockets. When the shank is rotated in one direction relative to the disk 19, the rollers jam and transmit driving rotation to the disk.

The disk 19 drives the spindle 20 which carries at its outer end the tool carrying chuck 21, through a flange 22 integral with the spindle. This flange is provided with spherical recesses 23 which receive driving balls 24 which engage at their opposite sides similar recesses 25 in the disk. The depth of these recesses is proportioned so that pressure on the driving spindle and thus on the balls produces a certain driving effect on the spindle and only permits relative movement of the disk and the flange after a predetermined overload strain has been reached on the spindle, such for instance as that which results when a tap strikes bottom in a hole being tapped. It will be seen that if the pressure on the driving shank is increased to increase the pressure on the tool in the chuck, then the load carried by the spindle before the disk and flange yield relatively under the load will be increased so that the same attachment will work satisfactorily for both large and small taps; because the greater downward pressure required by the large tap will also cause the overload responsive mechanism formed by the disk, flange and balls to yield through the balls riding out of the bottom of the recesses by riding up the sides of the recesses in the flange 22 only at a correspondingly higher overload. However, the balls never leave the recesses; the balls merely permit relative rotary displacement of the flange 22 and disk 19 when the latter is displaced axially due to an overload strain on the tool.

This overload responsive device controls the driving engagement of the rollers 18 through a disk 26 having depending ears 26a engaging notches 26b in the disk 22 and having upwardly extending ears 27 extending into the recess in which the rollers or jam elements are located. Thus when there is relative movement of the flange 22 with respect to the disk 19, the upstanding ear or prong 27 will be moved against the roller in a direction which will force the roller out of driving engagement in the tapered recess, completely releasing this positive clutch, and this clutch will stay released until the driving and driven spindles slow up or until greater pressure is placed on the shank to recenter the driving balls 24 in the bottom of the recesses whereupon the rollers 18 will be free to move into driving engagement again.

A spring 28 holds this disk in its uppermost position the disk serving to hold the rollers 18 in the recesses thereby preventing them from cocking or becoming tilted as they might when the driven spindle 20 with its flange 22 is moved away from the drive spindle and gear 15, as will presently be described.

Suitable reversing mechanism is put into operation by the operator pulling up on the driving shank after the tapper or tool has struck bottom. When the tool is thus pulled up the flange 22 on the driven spindle is pulled down against the action of spring 29 and engages a second positive clutch. This clutch consists of a driving part having dogs 30 on the flange 22 and a driven part formed by the upper face of the flanged gear 31 which face is recessed at 32 to receive reverse clutch teeth 33. When the driving shank is pulled up with the tap in a hole, the flange 22 is pulled toward the gear 31, the dogs engage with the teeth 33 and a gear 31 is thereby positively connected to the driven shank carrying the tool. This gear is constantly driven in the opposite direction from gear 15 by a pinion 36 rotating a shaft 35 at the upper end of which is a second gear 34 integral with gear 36 and gear 34 meshes with a gear 42 on a shaft 43 gear 42 being driven by the gear 15. All of the gears 31, 34, 35 and 36 are continuously driven as long as the driving shank is driven.

It has been found by actual trial, that if the teeth 33 are rigid and are properly inclined toward the face of the dogs 30 which face is at right angles to their direction of movement, so that the inclination of the tooth tends to produce the desired full engagement of dog and tooth, then the strain and wear will come on the upper corner of that tooth and the teeth for this reason wear rapidly. To avoid this, each tooth is given a long boat-shaped tail loosely fitting the recess 32 and this tail 37 is yieldingly pressed against the bottom of the recess by means of a spring 38 which engages at one end in a slot 39 of the tail and at the other end is turned up into a hole in a clamping block 40 which anchors the spring. Thus when the reversing clutch is operating the tail of the tooth will tilt upwardly until there is substantially a full engagement of the tooth face with the dog face. The yielding tooth also promotes full tooth engagement by reason of the time required to move said tooth into vertical position giving a moment before there is a full load on the tooth for the upward pressure on said tooth to fully engage the same.

The tension of spring 29 is preferably made a little more than sufficient to overcome the tendency of the weight of the parts on the driven spindle to press the dog into engagement with the teeth.

The tension of the spring 29 need be no more than enough to urge the disk 26 against the disk 19 in opposition to weight of the driven spindle and tool thereof so that a very slight load releases or even friction of the parts in sufficient to release the clutch when there is no pressure on the tool. Any conventional handle 41 serves to hold the tool against rotation as pressure is applied to the shank.

A modified construction for obtaining full tooth engagement between the reverse clutch tooth and dog is illustrated in Figs. 5 and 6. This construction employs a rotatable plate 45 having oppositely extending lugs 46, the plate loosely embracing the driven spindle 20 and resting on the upper face of the gear 31 which is provided with upstanding projections 47 which extend into the path of movement of the lugs 46 and thus stop the relative rotation of the plate 45 after approximately one-quarter of a turn. The plate is normally held in the position shown in Fig. 5 by means of a flat spiral spring 48 having an upstanding end 49 anchored in the lug 46 and a depending end 50 anchored in the gear 31. A spring 51 performs the same function as spring 29 in the embodiment previously described. In the operation of this embodiment when the driven spindle is pulled away from the drive spindle by the operator pulling up on the tool as a whole to withdraw a tap, the dog 30 is pulled down into engagement with the vertical face of the lug 46. If this occurs when the lug is practically at that face it will not at first fully engage but will catch on the upper corner of the lug. Since the downward pressure continues as long as the operator pulls the tap out and the load on the dog is slight for the first quarter of a turn, merely rotating the plate 45 against the spring 48, there will be no locking of the dog in the upper position and it will slide into full tooth engagement before the full load of withdrawing the tap bears on it as occurs as soon as the lug engages the projection 47.

What is claimed is:

1. In an attachment for boring machines, the combination with a driving spindle, of a driven spindle for carrying a tool, a fully releasable clutch, an overload responsive mechanism, connections to transmit power from said driving spindle through said clutch and mechanism to said driven spindle, means operated by said overload responsive device to fully release said clutch when there is an overload on the tool, said clutch including driving and driven parts, one of which has a tapered recess, a loose jam element in said recess normally operating to drive the driven part from the driving part, and said overload responsive mechanism having a driving section moving with the driven clutch part and a driven section fixed to the driven spindle and connected to said driving section for relative yielding movement with respect to the driving section in response to an overload, and a prong on the driven section extending into said recess to engage and move the jam element out of driving position on relative movement of said sections.

2. In an attachment for boring machines, the combination with a driving spindle, of a driven spindle for carrying a tool, a fully releasable clutch, an overload responsive mechanism, connections to transmit power from said driving spindle through said clutch and mechanism to said driven spindle, means operated by said overload responsive device to fully release said clutch when there is an overload on the tool, said driven spindle being mounted for axial movement and said overload responsive mechanism including clutch means on the driven spindle normally in release position, and connected to said driving spindle for engagement on inward axial movement of the spindle by pressure on the tool, and a train of driving gears driven from said driving spindle coacting with said clutch to drive the driven spindle when the last mentioned clutch is engaged.

3. In an attachment for boring machines, the combination with a driving spindle, of a driven spindle for carrying a tool, a fully releasable clutch, an overload responsive mechanism, connections to transmit power from said driving spindle through said clutch and mechanism to said driven spindle, means operated by said overload responsive device to fully release said clutch when there is an overload on the tool, said driven spindle being mounted for axial movement, reverse gearing operated from said driving spindle, a second clutch having a section connected to said gearing and a section connected to said driven spindle, for movement into operative engagement with the other section when the driving spindle is pulled away from the driven spindle.

4. In an attachment for boring machines, the combination with a driving spindle, of a driven spindle for carrying a tool, a fully releasable clutch, an overload responsive device, connections to transmit power from said driving spindle through said clutch and mechanism to said driven spindle, and means operated by said overload responsive device to fully release said clutch when there is an overload on the tool, said overload responsive device comprising parts connected respectively to said driven spindle, one of said parts being provided with recesses, elements on the other of said parts for engaging in said recess, said recesses and elements being shaped to permit relative movement as a result of overload without the elements leaving the recesses.

5. In an attachment for boring machines, the combination with a driving spindle, of a driven spindle for carrying a tool, a fully releasable clutch, an overload responsive device, connections to transmit power from said driving spindle through said clutch and mechanism to said driven spindle, and means operated by said overload responsive device to fully release said clutch when there is an overload on the tool, said overload responsive device comprising parts connected respectively to said driven spindle, recesses in one of said parts, elements on the other of said parts for engaging in said recesses, said recesses and elements being shaped to permit relative movement as a result of overload without the elements leaving the recesses, one of said overload device parts including a flange fixed to said driven spindle.

6. In an attachment for boring machines, the combination with a driving spindle, of a driven spindle for carrying a tool, a fully releasable clutch, an overload responsive device, connections to transmit power from said driving spindle through said clutch and mechanism to said driven spindle, means operated by said overload responsive device to fully release said clutch when there is an overload on the tool, said overload responsive device comprising two parts having opposed faces one connected to rotate with said driving spindle and one connected to rotate said driven spindle, recesses in said opposed faces, driving elements carried in the recesses of one face and engaging in the recesses in the other face, and means for limiting the relative rotary movement of said parts to retain said elements in said recesses under overload conditions.

7. In an attachment for boring machines, the combination with a driving spindle, of a driven spindle for carrying a tool, a fully releasable clutch, an overload responsive device, connections to transmit power from said driving spindle through said clutch and mechanism to said driven spindle, means operated by said overload responsive device to fully release said clutch when there is an overload on the tool, said overload responsive device comprising parts connected to said driving and driven parts and having relative movement in an axial direction toward each other in response to pressure on the tool and means on one of said parts and engaging the other of said parts holding the two parts against relative rotary displacement with a force proportional to the pressure on the tool, said parts cooperating to operate said means through relative rotary displacement when there is an overload on the tool.

8. In an attachment for boring machines, the combination with a driving spindle, of a driven spindle for carrying a tool, a fully releasable clutch, an overload responsive mechanism, connections to transmit power from said driving spindle through said clutch and mechanism to said driven spindle, and means operated by said overload responsive device to fully release said clutch when there is an overload on the tool, said overload responsive device comprising two parts having opposed faces at right angles to the driven spindle, one of said parts being rigidly secured to said driving spindle and the other of said parts having limited axial and rotational movement relative to said spindle to permit movement of one face toward the other on pressure on the tool carrying end of the driving spindle, opposed recesses in said faces, and balls in said recesses whereby resistance of said parts to relative rotary displacement by overload is increased as pressure on the tool is increased.

9. In an attachment for boring machines, a driving shank, a driven spindle for carrying a chuck, clutch parts connected one to said shank and the other to said spindle, one of said clutch parts having a tooth and the other of said parts having a dog for engagement with said tooth, said dog having a face extending at right angles to the direction of driving force and the tooth having a surface for engaging said dog inclined toward the surface of the dog whereby the dog has a tendency to work into full engagement with the tooth and a yieldable mounting for said tooth to permit tilting of the tooth into flat face to face engagement with the dog.

10. In an attachement for boring machines, a driving shank, a driven spindle for carrying a chuck, clutch parts connected one to said shank and the other to said spindle, one of said clutch parts having a tooth and the other of said parts having a dog for engagement with said tooth, said dog having a face extending at right angles to the direction of driving force and the tooth having a surface for engaging said dog inclined toward the surface of the dog whereby the dog has a tendency to work into full engagement with the tooth and a yieldable mounting for said tooth to permit tilting of the tooth into flat face to face engagement with the dog, said driven spindle being mounted for axial movement in response to pressure on the tool to bring one of said clutch parts into operating relation to the other and a reverse gear connected to one of said clutch parts and said shank and brought into operation by the engagement of said clutch parts to reverse the direction of rotation of the chuck.

11. A tapping chuck comprising a driving shank, a driven spindle in axial alignment therewith and having axial movement toward and away from the shank, a downwardly flanged gear secured to the driving spindle having a clutch face on the inner surface of said flange, clutch means yieldingly engaging with said surface and spindle to drive the spindle, reverse gearing driven from said driving shank and including a reverse gear coaxial with the spindle and fixed against axial movement, connections disengaging said clutch means and connecting the reverse gearing to said spindle when the shank is pulled away from the spindle, said connections including cooperating clutch parts on the spindle and reverse gear.

12. In a tapping chuck, the combination with a driving spindle, of a coaxial spindle movable toward and away from the driving spindle for holding a tool, a clutch part fixed to the driving spindle, a clutch part loosely surrounding the driven spindle, means driving the loose clutch part in the opposite direction of rotation from the first mentioned clutch part, a flange on said driven spindle extending between said clutch parts, clutch mechanism connected to one face of said flange for cooperation with the driving spindle clutch part, clutch means on the other face of said flange for cooperation with the loose clutch part so that the driven shaft is rotated in one direction or the other as the driven spindle is pushed toward or pulled away from the driving spindle, said mechanism and driving spindle clutch part having converging surfaces with jam elements between.

13. In a tapping attachment for boring machines, the combination with a driving spindle, of a driven tool carrying spindle relatively movable in an axial direction toward and away from the driving spindle and rotatable with respect thereto, primary clutch means for driving the said driven spindle in one direction, reverse gearing including clutch mechanism engaged by said relative axial movement of the driven spindle for reversing the direction of rotation of said driven spindle, and means for fully disengaging the primary clutch in response to the relative turning movement of said driven spindle with respect to said driving spindle.

14. In a tapping attachment for boring machines, the combination with a driving spindle, of a driven tool carrying spindle relatively movable in an axial direction toward and away from the driven spindle, primary clutch means for driving the said driven spindle in one direction, reverse gearing including clutch mechanism engaged by movement of the driven spindle for reversing the direction of rotation of said driven spindle, including clutch mechanism engaged by movement away from each other of the driving and driven spindle, means for releasing the primary clutch as in response to said relative movement of said driving and driven spindles, and said means including clutch release means held out of action by pressure on the tool urging one spindle toward the other.

15. In an attachment for boring machines, a driving shank, a driven spindle for carrying a chuck, clutch means connecting said shank and spindle to drive the latter in one direction, clutch parts mounted on said spindle and relatively movable toward and away from each other for transmitting movement in the opposite direction from said shank to said spindle, said parts carrying clutch elements having working faces extending transversely of the planes of rotation of said clutch parts for driving one part from the other, and means driven from said shank mounting one of said elements for limited relative movement on the part carrying it along the plane of rotation of the part, to give time for full face engagement of said elements before sustaining the driving load.

In testimony whereof, we have signed our names to this specification.

AXEL G. LUNDIN.
CARL W. JOHNSON.